United States Patent [19]

Bargroff et al.

[11] Patent Number: 4,910,653
[45] Date of Patent: Mar. 20, 1990

[54] POWER CONVERTER WITH CASCADED OUTPUT TRANSFORMERS

[75] Inventors: Keith P. Bargroff, Norwich; Howard S. Dawson, Aylsham, both of United Kingdom

[73] Assignee: Wavetek Corporation, San Diego, Calif.

[21] Appl. No.: 341,022

[22] Filed: Apr. 20, 1989

[30] Foreign Application Priority Data

Apr. 29, 1988 [GB] United Kingdom ............... 8810288

[51] Int. Cl.⁴ ........................................... H02M 3/337
[52] U.S. Cl. ...................................... 363/16; 323/361
[58] Field of Search ................. 323/361; 363/15, 16, 363/24, 25, 26

[56] References Cited

U.S. PATENT DOCUMENTS

| | | | |
|---|---|---|---|
| 3,963,975 | 6/1976 | Gauper et al. | 363/15 |
| 4,041,364 | 8/1977 | Gauper | 363/15 |
| 4,392,173 | 7/1983 | Rubin | 323/361 |
| 4,761,727 | 8/1988 | Kammiller | 323/361 |
| 4,796,173 | 1/1989 | Steigernald | 363/25 |

FOREIGN PATENT DOCUMENTS

| | | | |
|---|---|---|---|
| 115752 | 9/1979 | Japan | 363/26 |
| 102509 | 6/1983 | Japan | 363/15 |
| 98650 | 4/1923 | Switzerland | 323/361 |
| 504191 | 4/1976 | U.S.S.R. | 363/15 |

Primary Examiner—William H. Beha Jr.
Attorney, Agent, or Firm—Fulwider, Patton, Lee & Utecht

[57] ABSTRACT

In a power converter having a resonant output circuit transformer coupled to a load circuit, a transformer coupling circuit comprises at least two transformers providing a coupling stage having inductively coupled windings that are in step down relationship to an input and/or output winding of the transformer coupling circuit. This enables the rate of change of voltage in the coupling stage to be reduced and thus correspondingly reduces the transmission of interference from the power converter to the load circuit.

9 Claims, 3 Drawing Sheets

POWER CONVERTER WITH CASCADED OUTPUT TRANSFORMERS

BACKGROUND OF THE INVENTION

This invention relates to a so-called 'switch mode' power converter device of the kind wherein a D.C. voltage supply is provided by converting an input voltage derived from an A.C. or D.C. voltage source.

For sensitive equipment which requires minimisation of noise in order to achieve reasonable performance a suitably designed linear supply is usually employed. The use of linear supplies, however, is precluded when space, weight or efficiency are at a premium or when only a D.C. input voltage is available as a power source. In such cases, it is unnecessary to utilise a switching supply technique. Conventional switch-mode power supplies suffer, however, from noise problems that arise from the rapid energy transfer which is necessary to maintain efficiency.

With a view to reducing fast current edges occurring in a switch-mode power supply, it is known to utlise in the power output stage of a switching converter, a series resonant circuit. A power converter of this type is known, for example, from 'High frequency series resonant power supply—Design Review'; Unitrode Power Supply Design Seminar Book 1986; Pg A2-1. This publication describes a power converter for transforming an input voltage to provide a D.C. voltage output and comprising transformer means having an input winding coupled to a voltage input circuit and an output winding coupled to a rectifier circuit for providing said D.C. voltage output, said voltage input circuit including a voltage switching means for switching an input voltage at a given frequency and a resonant circuit so coupled to said voltage switching means that operation thereof is effective to drive current pulses of approximately sinusoidal wave-form through the said input winding.

Although such a known arrangement is effective in reducing electromagnetic interference in comparison with a conventional switch-mode power supply, difficulties do arise because of electrostatic interference transferred between the input and output circuits via the capacitive coupling both in the voltage transformer and the other circuit elements.

SUMMARY OF THE INVENTION

It is accordingly an object of the present invention to provide a further reduction of noise interference in a power converter of the known kind referred to.

In accordance with one aspect of the invention, this object is achieved in that said transformer means comprises at least two transformers of which one provides said input winding and another provides said output winding, coupling between the input winding of the one transformer and the output winding of the other being provided via two further windings of said transformer means that are in step-down relationship to said input and/or output winding whereby the rate of change of voltage in the said coupling connecting the input and output circuit of the converter is lower than occurs in said voltage input and/or output circuit.

An arrangement in accordance with the invention has the advantage that because of the step-down relationship in the windings providing coupling between the power input and power output circuits, the rate of change in voltage at a given frequency of operation of the converter is reduced, thus correspondingly reducing the transfer of noise.

Preferably the transformer means comprises at least three transformers, and the said two further findings inductively coupled windings of the third transformer. This enables the output winding of the transformer means to be in step-up relationship to said two further windings whereby for a given output voltage the rate of change of voltage in the said two further windings can be further reduced.

Particularly when the said two further windings are loosely inductively coupled, the coupling capacitance and the corresponding transfer of electrostatic interference is also reduced. This loose coupling of the windings also has the effect of increasing the leakage inductance of the transformer means as seen at the input winding coupled to the voltage input circuit, and thus the leakage inductance of the transformer can be rendered sufficient that a separate inductor can be dispensed with.

Further screening against electrostatic interference can be achieved by connecting to a corresponding ground both the input and/or output winding of the transformer means and a tapping on the circuit inductively coupled thereto via the same magnetic circuit.

By electrically interconnecting the said two further windings via a circuit for nulling common mode current, an even further reduction in electrostatically transmitted interference, can be achieved.

With a view to achieving a further reduction in the rate of change of voltage occurring in the converter, advantageously the voltage switching means may be modified to reduce the slew-rate of the switched voltage waveform in relation to that of the substantially square wave of the known systems.

Further features and advantages of the invention will become apparent by reference to the following description and drawings illustrating by way of example one embodiment of the invention.

BRIEF DESCRIPTION OF THE DRAWINGS

Referring to FIG. 1, there is shown a circuit diagram of a switched power converter providing D.C. to D.C. conversion from a 24 volt input and supplying—200 mA from—15 V outputs.

DETAILED DESCRIPTION OF PREFERRED EMBODIMENT

Figure 1:
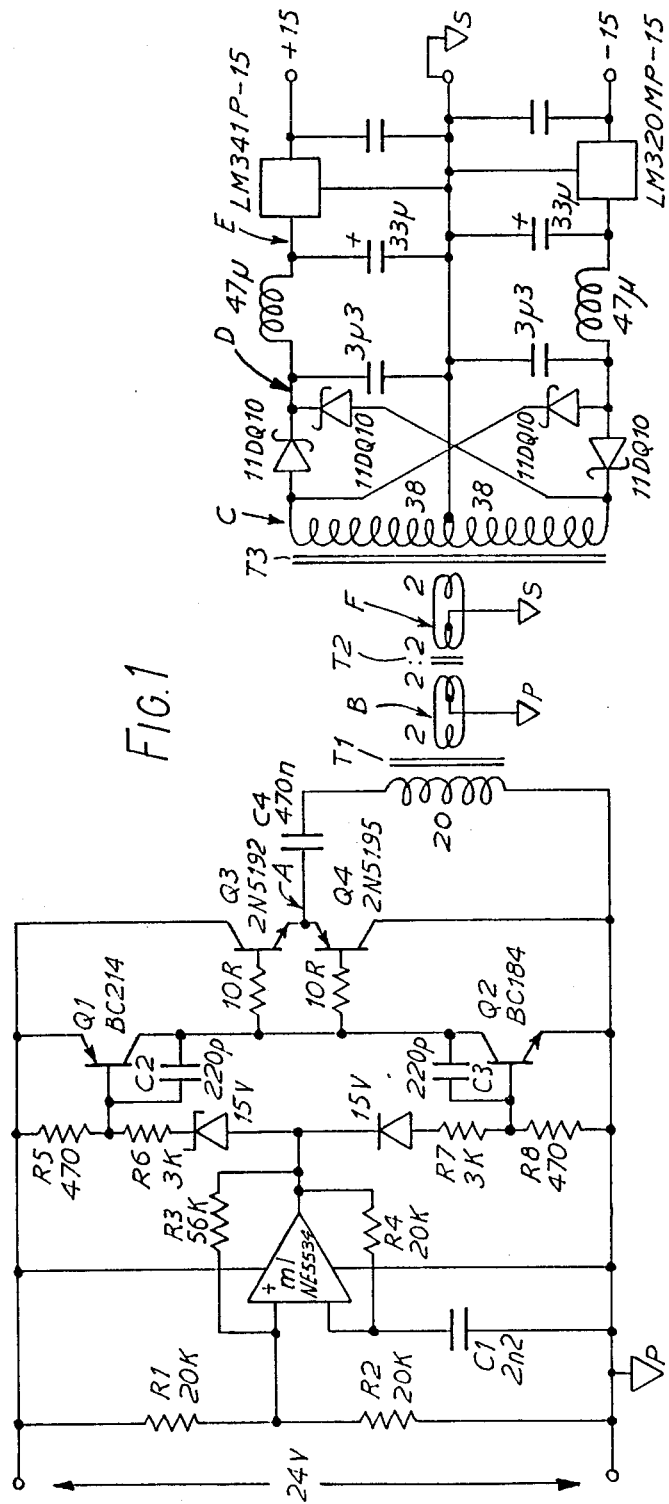
FIG. 1 is a circuit diagram of one embodiment of power converter in accordance with the invention.

In the drawing, conventional symbols are utilised to illustrate the electrical and electronic components, and the general configuration of the circuitry will be familiar to one skilled in the art of switched power supplies. Therefore the components and the circuit connections will not be itemised in detail, and will be referred to only in-so-far-as necessary to describe the general operation of the circuit. It will be assumed that the circuit is operating in a steady state with resistive loads (not shown) applied to the outputs of the rectifier circuit.

An operational amplifier M1 is configured as a relaxation oscillator such that its output swings within about 1.5 volts of either of its supplies with a waveform as indicated in the inset diagram associated with the arrow leading to the output of the amplifier. The slew-rate of this voltage waveform is defined by the characteristics of the operational amplifier M1. Because the output of the operational amplifier M1 only gets within 1.5 volts of each supply, transistors Q1 and Q2 are provided to pull the bases of transistors Q3 and Q4 to within about 0.3 volts of either voltage supply rail. This greatly reduces the power loss in transistors Q3 and Q4 as well as providing extra current gain as necessary to drive transistors Q3 and Q4.

It will be noted that transistors Q1 and Q2 are configured as integrators as a result of the provision of feed back capacitors C2 and C3. This has the effect of reducing the slew-rate of the switched voltage wave form provided at the output of transistors Q3 and Q4, as shown in the inset diagram associated with the signal input and voltage output of the transistors Q3 an Q4 by means of the attached arrows. In the particular circuit illustrated it will be noted that the slew-rate at the output of transistors Q3 and Q4 of approximately 50 volts per micro second is reduced to approximately 10 volts per micro second by the addition of C2 and C3.

Reference numerals T1, T2 and T3 indicate three cascaded transformers, the primary winding of transformer T1 being coupled to the output of transistors Q3 and Q4 via capacitor C4, the secondary winding of transformer T3 being coupled to a conventional bridge-rectifier with smoothing capacitors, with the addition of further LC filtering to reduce noise and ripple and post-regulation is achieved with conventional linear regulators. Schottky diodes are used for quick reverse recovery and low power loss. The transformer T serves to provide coupling between the secondary winding of transformer T1 and the primary winding of transformer T3. As will be seen from winding ratios indicated against the transformer windings, there is a step-own between the primary and secondary windings of transformer T1 and a corresponding step-up between the primary winding and secondary winding of transformer T3.

The windings of transformer T2 are loosely wound in order to reduce capacitive coupling between the primary and secondary windings. In addition, a centre tapping of the primary winding of transformer T2 is connected to a common ground P with the input voltage circuit in order to provide electrostatic screening. In similar manner the centre tapping of the secondary winding of transformer T2 is connected to a common ground S with the voltage output circuit. It should be noted that the respective common grounds P and S are electrically isolated from one another.

As will be understood by one familiar with the operation of the known series resonant converters such as described above, the output circuit of transistors Q3 and Q4 has a resonant frequency determined by the value of the capacitor C4, and the leakage inductance provided by transformers T1, T2 and T3. This is so related to the period of the voltage wave form appearing at the output of transistors Q3 and Q4 that the corresponding current flow through the primary winding of transformer T1 is in the form of approximately sinusoidal current pulses (FIG. 2b), thus reducing electromagnetic interference. The current pulses are bi-directional, but separated by dead spaces. It will be noted that unlike known arrangements utilising a single transformer, the transformer winding receiving the input voltage and that providing the output voltage are not in the same magnetic circuit.

Figure 2:
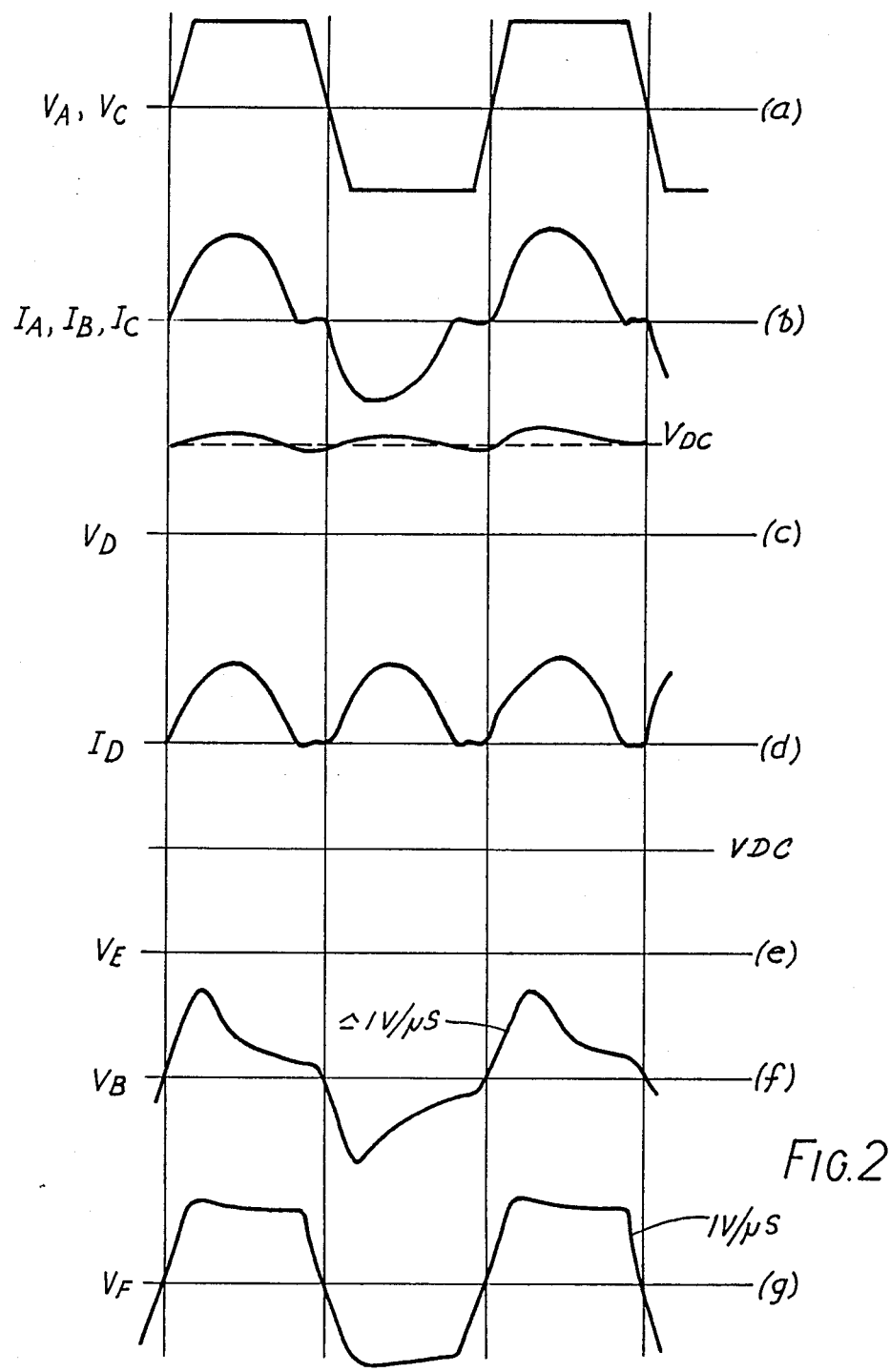
FIGS. 2a and 2g are diagrams (not to scale) illustrating voltage and current waveforms appearing at corresponding points in the circuit of FIG. 1.

The presence of a further magnetic circuit, in this case that of transformer T2, providing coupling between windings that are in step down relationship to the primary winding of the input circuit serves to reduce the rate of change of voltage in the coupling between the input and output circuits (FIG. 2f & 2g). In comparison with the known arrangement, noise is further reduced by the loose magnetic coupling of the windings of transformer T2 which has the effect of reducing capacitive coupling between the voltage input and the voltage output circuits. Electrostatic interference is therefore further reduced, and the corresponding increase in leakage inductance of the cascaded transformers enables elimination of the separate inductor normally required in the series resonant circuit.

The arrangement illustrated enables the voltage input and voltage output circuits to be both electrically and physically separate. The D.C. output voltage can thus be allowed to float relatively to the input voltage, and the circuits can be independently enclosed within electrostatic screens in order further to reduce noise interference. Very high isolation voltages can be achieved between the circuits using appropriate insulation materials, and for the same reason very low D.C. leakage current can be achieved.

Although FIG. 1 illustrates one arrangement in accordance with the invention, it will be appreciated that various modifications may be made to the circuitry illustrated without departing from the scope of the invention. For example, in place of the slew-rate control provided by transistors Q1 and Q2, a reduction in slew-rate could be achieved by appropriate selection of a slow operational amplifier M1 arranged to drive transistors Q3 and Q4 directly. It should be noted that unlike conventional switch mode power supplies reduction in the slew-rate of the switched input voltage does not lead to a significant reduction in efficiency because, during the voltage slew period, the current flowing is low.

Figure 3:
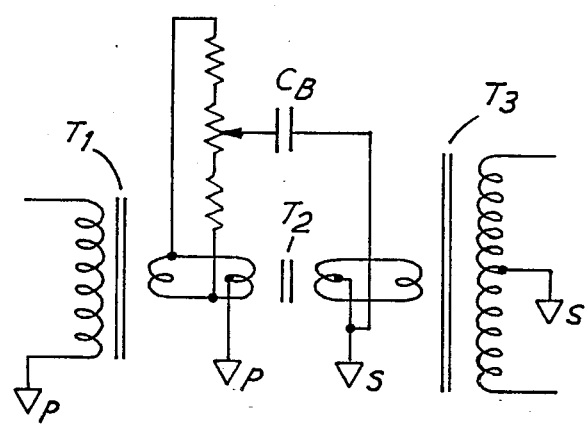
FIG. 3 is a diagram illustrating a modification to the circuit of FIG. 1.

A further improvement in reduction of electro-static interference can be obtained by connecting between the primary and secondary of transformer T2 a bucking circuit arranged to inject an equal but opposite common mode current from the primary circuit to the secondary circuit in order to cancel out any residual common-mode current. Such a circuit is illustrated in FIG. 3 wherein the bucking capacitor $C_B$ is connected between the centre tapping of the secondary winding of the transformer T2 and a potential divider connected across the primary winding. It should be noted that the value of the bucking capacitor $C_B$ should be small in order not to degrade the intrinsically low primary to secondary capacitance of the transformer.

Although the arrangement illustrated shows the use of three transformers, in cases where the ratio between desired input and output voltages permits, only two transformers may be used. The configuration of the transformer circuit would then be similar, but with either transformer T1 or T3 removed and a direct connection being made to the primary or secondary winding of transformer T2.

What is claimed is:

1. In a power converter for transforming an input voltage o provide a D.C. voltage output and comprising transformer means having an input winding coupled to a voltage input circuit and an output winding coupled to a rectifier circuit for providing said D.C. voltage output, said voltage input circuit including a voltage switching means for switching an input voltage at a given frequency and a resonant circuit so coupled to said voltage switching means that operation thereof is effective to drive current pulses of approximately sinusoidal wave-form through the said input winding, the improvement wherein said transformer means comprises at least two transformers of which one provides said input finding and another provides said output winding, coupling between the input winding of the one transformer and the output winding of the other being provided via two further windings of said transformer means that are in step-down relationship to at least one of said input and output windings whereby the rate of charge of voltage in the said coupling connecting the input and output circuits of the converter is lower than occurs in at least one of said voltage input and output circuits.

2. The improvement according to claim 1, wherein said transformer means comprises at least three transformers, and the said two further windings comprise inductively coupled windings of the third transformer.

3. The improvement according to claim 1, wherein the said two further windings are loosely inductively coupled whereby the coupling capacitance of the transformer is reduced.

4. The improvement according to claim 1, wherein the capacitance of said series resonant circuit is so selected in relating to the leakage inductance of said transformer means as seen at said input winding that the desired resonant frequency of the circuit is achieved without any additional inductor.

5. The improvement according to claim 1, wherein a point on said input and/or output winding and a point in the circuit inductively coupled thereto via the same magnetic circuit are electrically coupled to a corresponding common ground in order to provide electrostatic screening.

6. The improvement according to claim 1, wherein said two further windings are electrically connected via a circuit for nulling common mode current.

7. The improvement according to claim 1, wherein said voltage switching means includes means reducing the slew-rate of the switched voltage waveform.

8. The improvement according to claim 7, wherein said means reducing the slew-rate comprises switch driving means configured to provide an integrating function.

9. The improvement according to claim 7, wherein said means reducing the slew-rate comprises an oscillator circuit arranged to drive said voltage switching circuit at said given frequency and incorporating an active element the switching time of which is slow in relation to the frequency of the oscillator.

* * * * *

UNITED STATES PATENT AND TRADEMARK OFFICE
CERTIFICATE OF CORRECTION

PATENT NO. : 4,910,653

DATED : March 20, 1990

INVENTOR(S) : Keith P. Bargroff and Howard S. Dawson

It is certified that error appears in the above-identified patent and that said Letters Patent is hereby corrected as shown below:

Column 1, line 16, delete "unnecessary" and insert --necessary--;
Column 1, line 22, delete "utlise" and insert --utilise--;
Column 1, line 62, delete "circuit" and insert --circuits--;
Column 2, line 44, delete "and" and insert --through--;
Column 3, line 33, delete "T" and insert --T2--;
Column 3, line 37, delete "step-own" and insert --step-down--;
Column 4, line 64, delete "o" and insert --to--;
Column 5, line 8, delete "finding" and insert --winding--;
Column 5, line 14, delete "charge" and insert --change--; and
Column 6, line 1, delete "relating" and insert --relation--.

Signed and Sealed this

Twenty-sixth Day of March, 1991

Attest:

HARRY F. MANBECK. JR.

*Attesting Officer*     *Commissioner of Patents and Trademarks*